(12) United States Patent
Ishii

(10) Patent No.: US 6,370,786 B2
(45) Date of Patent: Apr. 16, 2002

(54) MEASURING METHOD AND APPARATUS THEREOF

(76) Inventor: Masato Ishii, 10482, Takayama-cho, Ikoma-shi, Nara-ken (JP), 630-0101

( * ) Notice: Subject to any disclaimer, the term of this patent is extended or adjusted under 35 U.S.C. 154(b) by 0 days.

(21) Appl. No.: 09/814,075

(22) Filed: Mar. 22, 2001

Related U.S. Application Data

(62) Division of application No. 09/200,746, filed on Nov. 30, 1998.

(30) Foreign Application Priority Data

Jul. 17, 1998 (JP) .......................................... 10-202540

(51) Int. Cl.$^7$ ................................................ G01B 5/12
(52) U.S. Cl. ..................................... 33/501.12; 33/542
(58) Field of Search ........................... 33/792, 793, 794, 33/795, 542, 555.1, 555.3, 501.02, 501.12

(56) References Cited

U.S. PATENT DOCUMENTS

| | | | | |
|---|---|---|---|---|
| 2,502,051 A | * | 3/1950 | Kulcsar et al. | 33/542 |
| 2,822,622 A | * | 2/1958 | Meyer | 33/542 |
| 4,131,837 A | | 12/1978 | Whetham | |
| 4,265,026 A | * | 5/1981 | Meyer | 33/542 |
| 4,288,924 A | * | 9/1981 | Mizuno et al. | 33/794 |
| 4,385,446 A | * | 5/1983 | Roch et al. | 33/542 |
| 4,425,715 A | * | 1/1984 | Willis et al. | 33/542 |
| 4,890,421 A | | 1/1990 | Moore, Jr. et al. | |
| 5,297,055 A | | 3/1994 | Johnstone | |
| 5,454,175 A | * | 10/1995 | Li | 33/542 |
| 5,726,917 A | | 3/1998 | Staaden | |
| 5,737,244 A | | 4/1998 | Ruck | |
| 6,003,237 A | * | 12/1999 | Sarr et al. | 33/542 |

* cited by examiner

*Primary Examiner*—G. Bradley Bennett
(74) *Attorney, Agent, or Firm*—Wenderoth, Lind & Ponack, L.L.P.

(57) ABSTRACT

A measuring apparatus is provided, in which a machined part is measured very simply and rapidly without affecting the effect unique to a machining center and the correction work with the measuring work can be immediately performed. The apparatus comprises a base mounted removably on a spindle of a machining center A, a slider provided in the axial center of the base in such a manner as to be slidable by operation of an operating unit exposed outside of the base, probes adapted to slide into and out at equidistant positions on the outer peripheral surface at the forward end of the base and adapted to protrude through an appropriate interlocking mechanism when the slider slides in one direction, and a display unit arranged outside of the base for detecting, through a detector, the size of the portion of the probe protruded with the sliding of the slider and displaying the measurement of the detector, wherein the machined part is measured immediately after machining.

14 Claims, 6 Drawing Sheets

MEASURING METHOD AND APPARATUS THEREOF

This is a divisional application of Ser. No. 09/200,746, filed Nov. 30, 1998.

BACKGROUND OF THE INVENTION

1. Field of the Invention

This invention relates to an apparatus for measuring whether or not a machined part, immediately after being cut appropriately has been machined according to specifications.

2. Description of the Prior Art

In the present world where a remarkable improvement of productivity is required, a machining center plays an increasingly important role.

In view of this, products that have been machined are measured by a worker using a measuring apparatus (a measuring instrument or a gauge) at the machining site or in an inspection room (measurement and gauging) equipped with measuring apparatuses.

With this measuring system, considerable labor is required for the measuring work and the measurement cannot be known instantly immediately after the machining.

For this reason, the measurement cannot be corrected immediately at a machining center. Therefore, the effect of using the machining center is reduced considerably.

A sampling method is used for the measuring work which is especially burdensome.

In that case, all the articles machined after an article that has developed a trouble are assumed to be defective and require considerable labor for remachining, resulting in a considerably increased cost.

Also, a female screw has thus far been machined with a tool called a tap and therefore developed no variations in the machined size.

Recently, however, a method has been employed in which a planet tap is rotated (autorotation) for arcuate cutting (revolution) during which the work is fed by the pitch of the screw for threading.

According to this method, screws of different diameters can be machined with a single planet tap by changing the radius of revolution.

In this machining method, the size of the planet tap is measured, and the radius of revolution is calculated by subtracting the tap size from the machined diameter. The result is varied in size due to calculation errors or depending on the machining conditions. Thus the measuring work is required.

The measuring work, however, requires many gauges (go gauges and not—go gauges) conforming with the screw size and thread pitch.

SUMMARY OF THE INVENTION

In view of this, the object of the present invention is to provide a measuring method and a measuring apparatus which can make measurements with great simplicity and rapidity without affecting the effects unique to the machining center and which can correct numerical values with the measuring work, thereby immediately permitting corrective machining by the machining center.

In order to solve the above-mentioned problems, the present invention employs a configuration comprising a base removably mounted on the spindle of a machining center, a slider built at the axial center of the base to slide by the operation of an operating unit exposed outside of the base, a plurality of probes adapted to slide inward and outward at equidistant positions on the outer peripheral surface at the forward end of the base and arranged to protrude through an appropriate interlocking mechanism when the slider slides in one direction, an appropriate detector for detecting the size of the portion of each probe protruded with the slide of the slider, and a display unit arranged outside of the base to display the measurement taken by the detector.

Also, the invention employs a configuration comprising a base removably mounted on the spindle of a machining center, a piston built in a hollow chamber formed in the base for applying the backward restitutive power, a fluid supply path connected to a fluid path of the machining center and communicating with the rear side of the piston in the hollow chamber when the base is mounted on the machining center, a slider protruded forward with the piston and slidably built at the axial center of the base, a plurality of probes adapted to slide inward and outward at equidistant positions on the outer peripheral surface at the forward end of the base and protruded through an appropriate interlocking mechanism when the slider slides in one direction, an appropriate detector for detecting the size of the portion of each probe protruded with the sliding motion of the slider, and a display unit arranged outside of the base for displaying the measurement taken by the detector.

Further, the invention employs a configuration comprising a base removably mounted on the spindle of a machining center, a fitting hole formed inward from the forward end of the base, an axial member slidably inserted and fitted in the fitting hole, stopper means for limiting the sliding range of the axial member, push-back means arranged on the axial member for pushing back the slide to the intermediate position of the sliding range, a piston built in the hollow chamber of the axial member for applying a backward restitutive power, a fluid supply path adapted to be connected with the fluid path of the machining center and passing to the rear side of the piston in the hollow chamber when the base is mounted on the machining center, a slider protruded forward with the piston and slidably built in at the axial center of the axial member, a plurality of thread probes adapted to slide inward and outward at equidistant positions on the outer peripheral surface at the forward end of the base and protruded through an appropriate interlocking mechanism when the slider slides in one direction, an appropriate detector for detecting the size of the portion of each probe protruded with the sliding motion of the slider, and a display unit arranged outside of the base for displaying the measurement taken by the detector.

Also, a centripetal function can be provided to the base and the axial member.

Further, the measurement taken by the detector can be retrieved as an electrical signal representing the displacement measured by a displacement gauge and input to a control unit of the machining center.

DETAILED DESCRIPTION OF THE PREFERRED EMBODIMENT

Embodiments of the present invention will be described with reference to the accompanying drawings.

Figure 1:
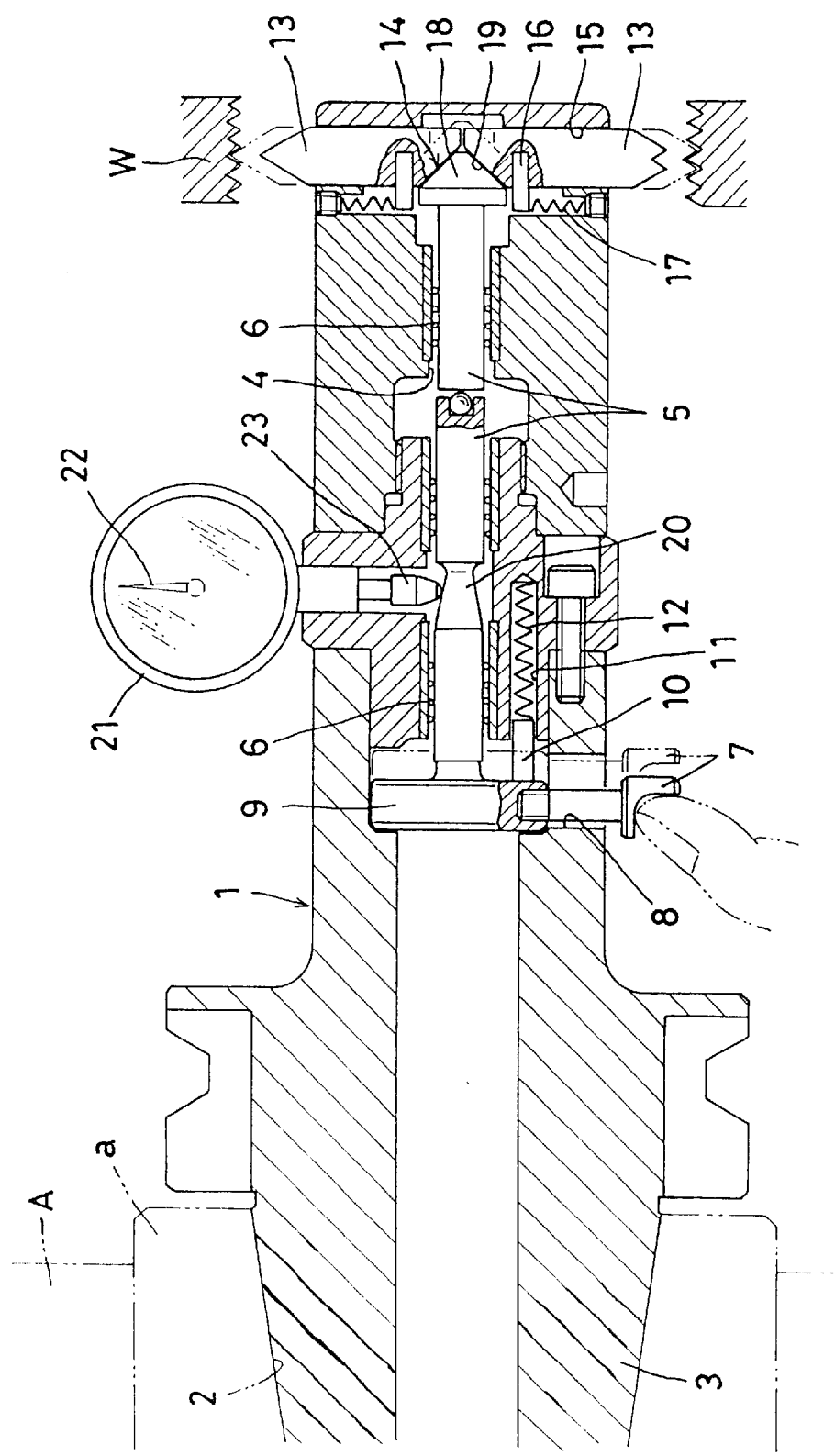
FIG. 1 is a longitudinal sectional view of a first embodiment of this invention.

According to a first embodiment of this invention, as shown in FIG. 1, a base 1 is removably mounted on a spindle a of a machining center A.

In mounting the base 1 removably, in the shown case, a taper shank 3 at the tail end of the base 1 is fitted in a tapered hole 2 of the spindle a.

Also, a hole 4 is formed in the shaft center of the base 1, and a slider 5 is slidably built or inserted in the hole 4.

The smooth sliding motion of the slider 5 is assured by bearings 6 with which the slider 5 is built in as shown.

As shown in FIG. 1, smooth sliding movement of the slider 5 can be secured by building the slider 5 therein through a bearing 6.

Also, an operating unit 7 for sliding the slider 5 is arranged on the outside of the base 1.

In the illustrated case, a slot 8 for communicating the hole 4 and the outer periphery of the base 1 is formed lengthwise along the axis of the base 1, and the inner end of an axial member constituting the operating unit 7 inserted in the slot 8 is fixed at the tail end of the slider 5.

Further, the slider 5 is urged backward toward the shank 3 by a restitutive power.

The restitutive power is provided, in the shown case, in such a manner that a plurality of pins 10 protruded from the peripheral edge of the side of a disk 9 arranged at the tail end of the slider 5, which is nearer to the slider 5, are fitted in an insertion hole 11 outside of the hole 4 and a spring 12 is disposed in the insertion hole 11.

Also, a plurality of probes 13 adapted to slide in and out are provided at equidistant positions on the outer peripheral surface at the forward end of the base 1. When the slider 5 is pushed out (advanced rightward in FIG. 1) by the operating unit 7, the probes 13 are adapted to slide in such a direction so as to protrude through an interlocking mechanism 14.

The probes 13 are slidably inserted in a through hole 15 communicating between the hole 4 and the outer peripheral surface of the base 1. Each probe 13 is given a restitutive power in the retracting direction by a spring 17 with the ends thereof engaging the base 1 and a pin 16 of the probe 13. The interlocking mechanism 14 includes, in the illustrated case, an umbrella-shaped tapered portion 18 formed at the forward end of the slider 5 and a tapered surface section (inclined surface) 19 formed at the tail end of each probe 13 and adapted to come into contact with the tapered portion 18. With the advance of the slider 5, each probe 13 is protruded radially outwardly by the tapered surface portion 18.

In the illustrated case, one of the probes 13 with the forward end thereof adapted to come into contact with the ridge of a thread is arranged at one end of a line crossing the center of the base 1, and the other probe 13 with the forward end thereof adapted to come into contact with the valley of the thread is arranged at the other end of the line to measure the threads cut in a work W. As an alternative, probes may be provided for measuring the diameter of a hole or an appropriate number of probes can be used as required.

The interlocking mechanism 14 is of course not limited to the shown configuration, but can be of such a type that each probe 13 is protruded with the forward slide of the slider 5 such as a link mechanism.

Further, the base 1 includes a detector 20 for detecting the size of the part of each probe 13 protruded with the sliding movement of the slider 5 and a display unit 21 for displaying the measurement detected by the detector 20.

The detector 20 includes a tapered axial portion formed midway of the slider 5, with which the end of a rod 23 for actuating an indicator 22 of a dial gauge is brought into contact. With the advance of the slider 5, the contact point of the actuating rod 23 transfers from the small diameter side to the large diameter side of the tapered axial portion to thereby rotate the indicator 22. The measurement can be indicated by a different configuration.

With the configuration described above, a cutting tool (not shown) for machining the work W is removed from the spindle a after machining the work W, and the base 1 is mounted on the spindle a as shown in FIG. 1.

After that, the forward end of the base 1 is fitted in the machined part of the work W.

When a worker operates the operating unit 7 and advances the slider 5, each probe 13 is protruded by the interlocking mechanism 14 and the forward end of each probe 13 is brought into contact with the machined part.

In the process, the size of the protruded part of each probe 13 is detected by the detector 20, and the detection value is displayed on the display unit 21.

The measurement displayed on the display unit 21 indicates whether the machined part has been machined to a specified size. If the parts is not successfully machined to the specified size, the control unit of the machining center is adjusted (corrected) appropriately.

Figure 2:
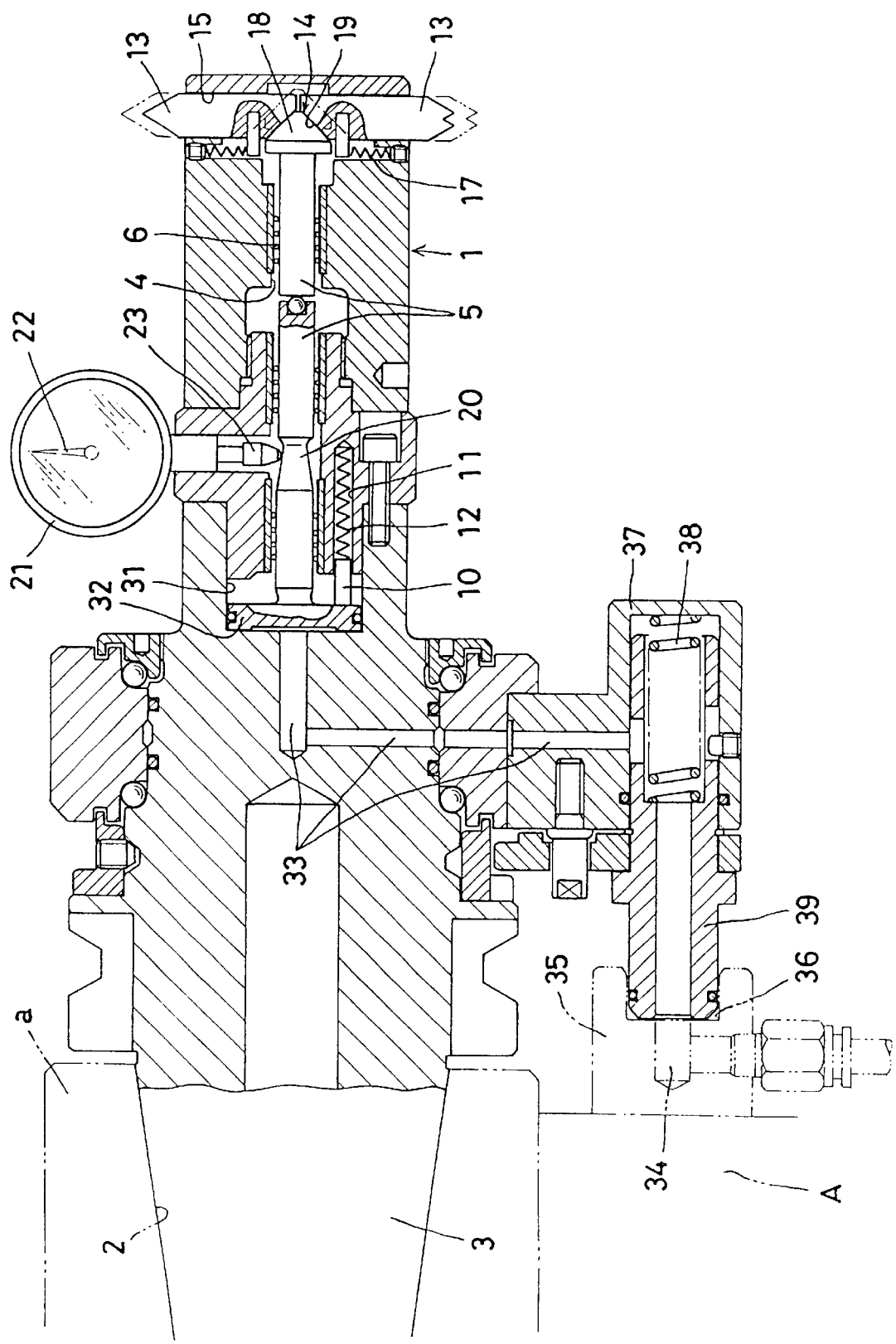
FIG. 2 is a longitudinal sectional view of a second embodiment.

According to a second embodiment of the present invention, as shown in FIG. 2, a hollow chamber 31 communicating with the tail (rear) end of the hole 4 is formed in the base 1 which is similar to the base 1 in the first embodiment, and a piston 32, which is connected to the slider 5, is disposed in the hollow chamber 31.

Also, a fluid supply path 33 is formed so as to communicate between the portion of the piston 32 on the rear side of the hollow chamber 31 and the outer peripheral surface of the base 1. This fluid supply path 33 is connected to a fluid path 34 of the machining center A when the base 1 is mounted on the spindle a.

The fluid path 34, as shown in FIG. 2, is arranged so as to communicate with the bottom of a fitting hole 36 formed in the front surface of a block 35 of the machining center A. When the base 1 is mounted on the spindle a, the forward end of a cylindrical member 39 (an end of the cylindrical member 39 communicates with the inlet of the fluid supply path 33) for applying a protruding force through a spring 38 is pushed into the fitting hole 36 formed in an outer holder 37 of the base 1.

Then, a fluid (air) is supplied from the fluid path 34 to the hollow chamber 31 through the cylindrical member 39 and the fluid supply path 33 to thereby advance the slider 5 with the piston 32 (toward the forward end of the base 1).

By the way, in place of the fluid supply means described above, the portion of the hollow chamber 31 on the rear side of the piston 32 may communicate (not shown) with the path in the axial center of the base 1.

The probes 13 are protruded through the interlocking mechanism 14 with the advance of the slider 5. Also, the detector 20, the display unit 21, the slider 5 and the application of the restitutive power to the probes 13 are similar to the corresponding functions in the first embodiment and will not be described.

With the configuration described above, the fluid is supplied under pressure into the hollow chamber 31 from the fluid path 34 through the cylindrical member 39 and the fluid supply path 33 at the time of measuring a machined part.

Then, while the slider 5 is advanced with the piston 32, the machined part is measured and the measurement is displayed on the display unit 21 as in the first embodiment.

Figure 3:
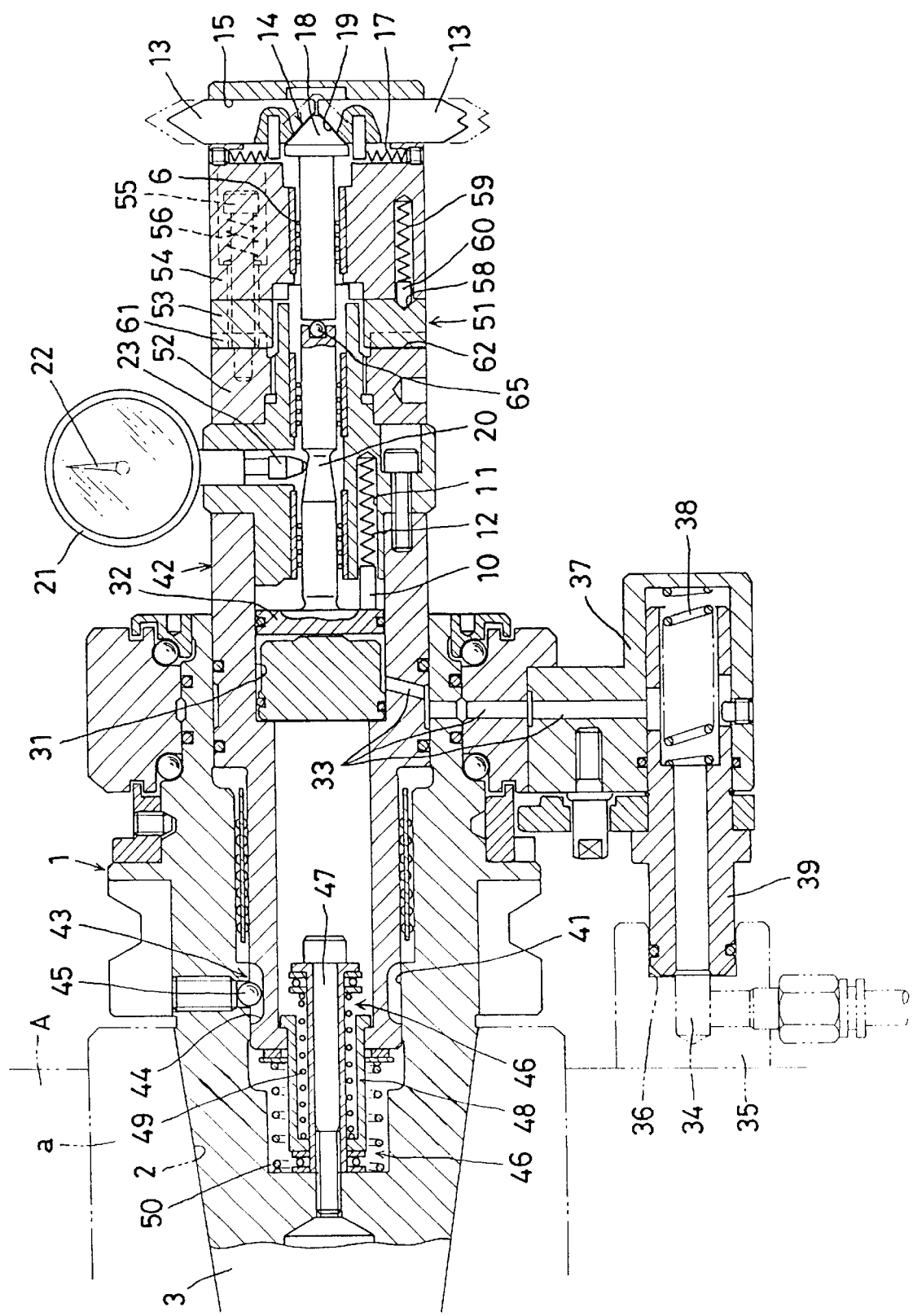
FIG. 3 is a longitudinal sectional view of a third embodiment.

According to a third embodiment of the invention, as shown in FIG. 3, a fitting hole 41 directed inward from the forward end of the base 1 is formed in the base 1 similar to that of the first embodiment. The range of sliding in the directions of protrusion and retraction of the axial member 42 slidably inserted in the fitting hole 41 are limited by stopper means 43.

The stopper means 43 includes, in the shown case, a groove 44 formed in the axial member 42 and a ball 45 arranged on the base 1 in such a position that an outer peripheral part of the ball 45 is fitted in the groove 44.

Also, the axial member 42 includes push-back means 46 for pushing back the axial member 42 to the intermediate position in the slide range (the position where the ball 45 is located at the center between the ends of the groove 44).

In the illustrated case, the push-back means 46 includes a cylindrical member 48 fitted on a protruded shaft 47 protruding forward from the bottom of the fitting hole 41 and having the forward end thereof engaging the tail end of the axial member 42, a first spring 49 with an end thereof engaging the tail end of the cylindrical member 48 and the other end thereof engaging the forward end of the protruded shaft 47, and a second spring 50 with the ends thereof in contact with the bottom of the fitting hole 41 and the tail end of the axial member 42, respectively. The axial member 42, which is subjected to the force in the direction of retraction by the first spring 49 and the force in the direction of protrusion by the second spring 50, is stopped at a neutral position (so that the ball 45 is located at the center of the groove 44).

The piston 32 disposed in the hollow chamber 31, the slider 5 connected to the piston 32, the probes 13 protruded through the interlocking mechanism 14 with the advance of the slider 5 and the display unit 21 for displaying the measurement through the detector 20 are similar to the corresponding parts of the first embodiment, and therefore, will not be described. Also, the fluid supply means for advancing the slider 5 with the piston 32 is similar to the corresponding part of the second embodiment and will not be described.

With this configuration, assume that the forward ends of the probes 13 are brought into contact with the ridge and the valley, respectively, of the machined thread, and initially fail to come into full contact. In that case, the forward end of one probe 13 can be positively (accurately) brought into contact with the ridge of the thread and the forward end of the other probe 13 into contact with the valley of the thread for measurement while sliding the axial member 42 in the direction of protrusion or retraction.

If the groove 44 is an annular groove, the measuring work can be performed by rotating the axial member 42 with respect to the base 1 on the one hand and the display unit 21 can be relocated to an easy-to-see position.

According to a fourth embodiment of the invention, a centripetal mechanism 51 is provided at the forward end of the base 1 and the forward end of the axial member 42.

Figure 4:
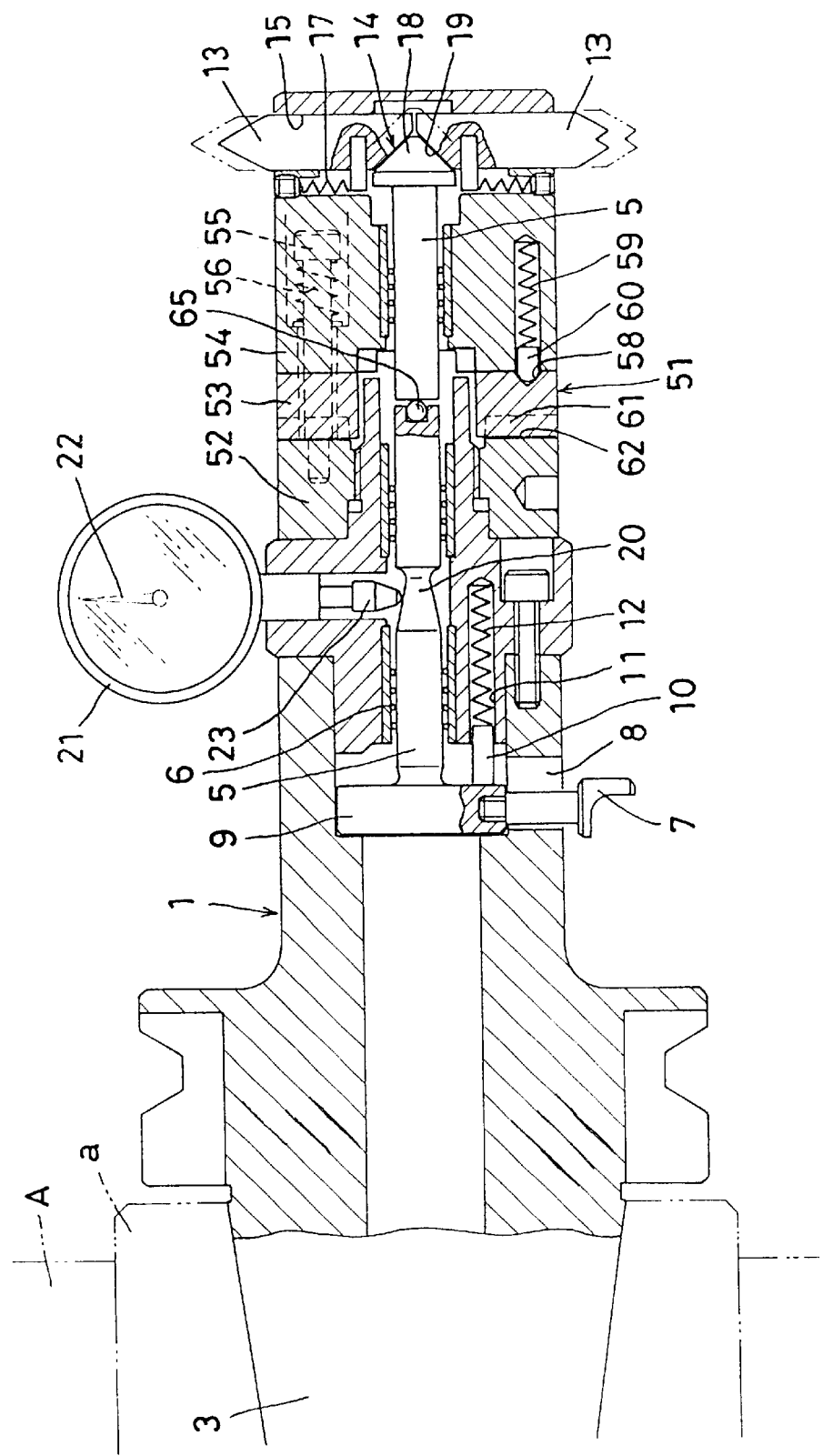
FIG. 4 is a longitudinal sectional view of a fourth embodiment.
Figure 5:
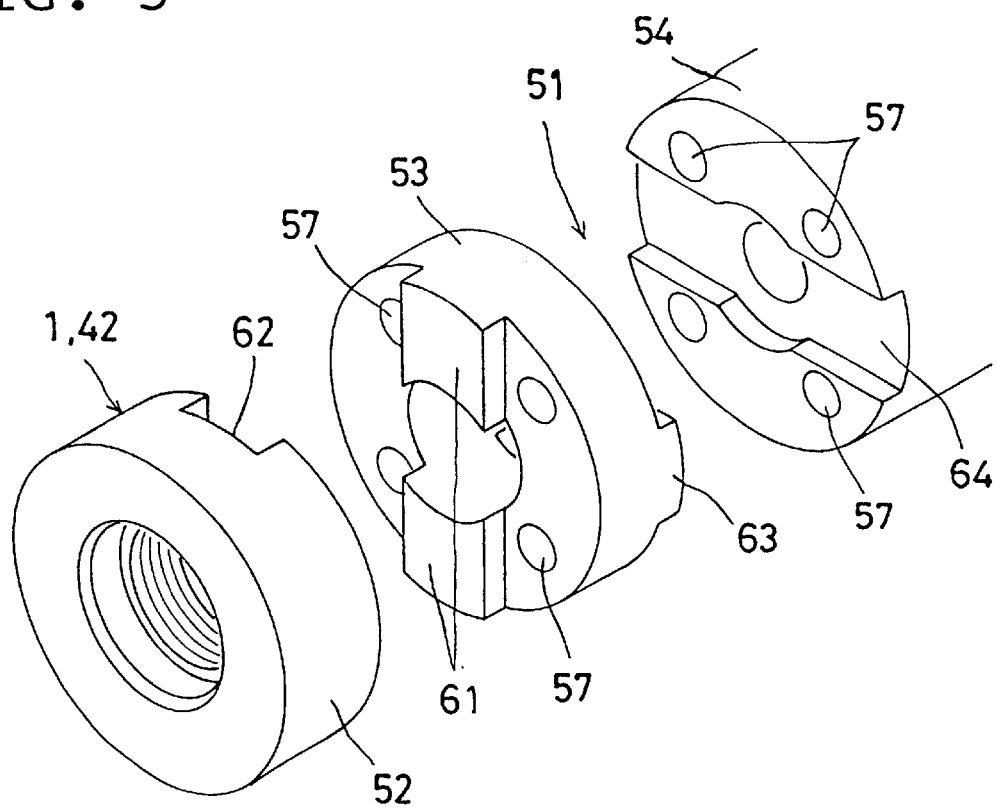
FIG. 5 is an exploded perspective view of the essential parts.
Figure 6:
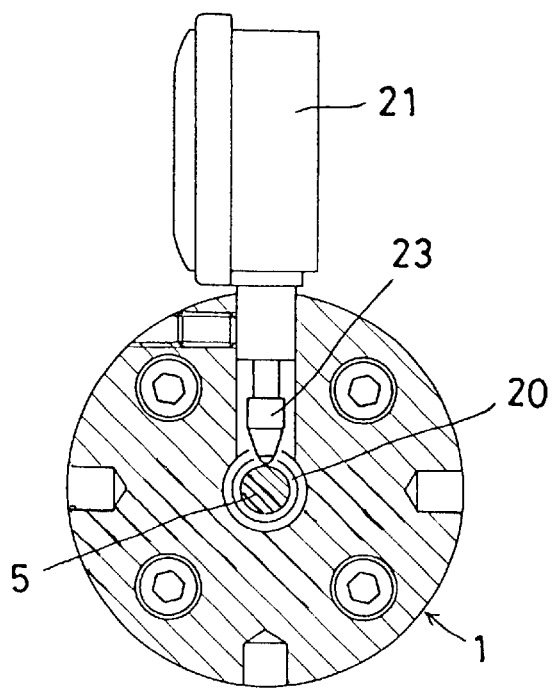
FIG. 6 is a longitudinal front view of the essential parts.

This centripetal mechanism 51 is configured as follows. As seen from FIGS. 3, 4 and 6, the base 1 and the axial member 42 are divided into a rear portion 52, an intermediate portion 53 and a front portion 54. The rear portion 52, the intermediate portion 53 and the front portion 54 are coupled to each other via through holes 57 in registry with each other by forcing a plurality of bolts 55 into the rear portion 52, which bolts are fitted in the through hole 57 with some clearance. At the same time, the intermediate portion 53 and the front portion 54 are pressed against the rear portion 52 by a spring 56 fitted on the head of the bolt 55. Also, one of the overlapped surfaces between the rear portion 52 and the intermediate portion 53 and the overlapped portion between the intermediate portion 53 and the front portion 52 is formed with a V-shaped hole 58, which is fitted with the protrusion 60 formed on the other overlapped surface. In order to assure a uniform clearance between the bolt 55 and the through hole 57, a protrusion 61 and a groove 62 to be fitted with each other for guiding the slide in the X direction are formed on the overlapped surfaces between the front portion 52 and the intermediate portion 53, while a protrusion 63 and a groove 64 to be fitted with each other for guiding the slide in the Y direction are formed in the overlapped surfaces between the intermediate portion 53 and the front portion 54. The intermediate portion 53 can slide somewhat along the X direction, and the front portion 54 can slide somewhat along the Y direction, thus providing the centripetal function.

Then, the measuring work can be performed without any problem even in the presence of some wobbling, because of the centripetal function which automatically works at the time of the measuring work.

In the case where the portion of the slider 5 having the centripetal function is separated with a ball 65 interposed between the ends of the separated parts as shown, the tracking ability of the centripetal function is improved. Also, the centripetal function can be replaced in case of a different screw diameter or a different screw pitch, and therefore, the replacement accuracy is improved.

Before measuring a product, a master gauge (a work of accurate size) or a presetter is used in advance for measurement so that the indicator of the dial gauge is set to zero. In this way, the absolute value can be determined.

According to a fifth embodiment of the invention, the measurement by the detector 20 is measured by a displacement gauge 71, and the displacement thus measured is retrieved as an electrical signal and input to the control unit 72 of the machining center A. When the electrical signal is input to the control unit 72 in this way, a dimensional error, if any, is automatically corrected in preparation of the next machining step.

Figure 7:
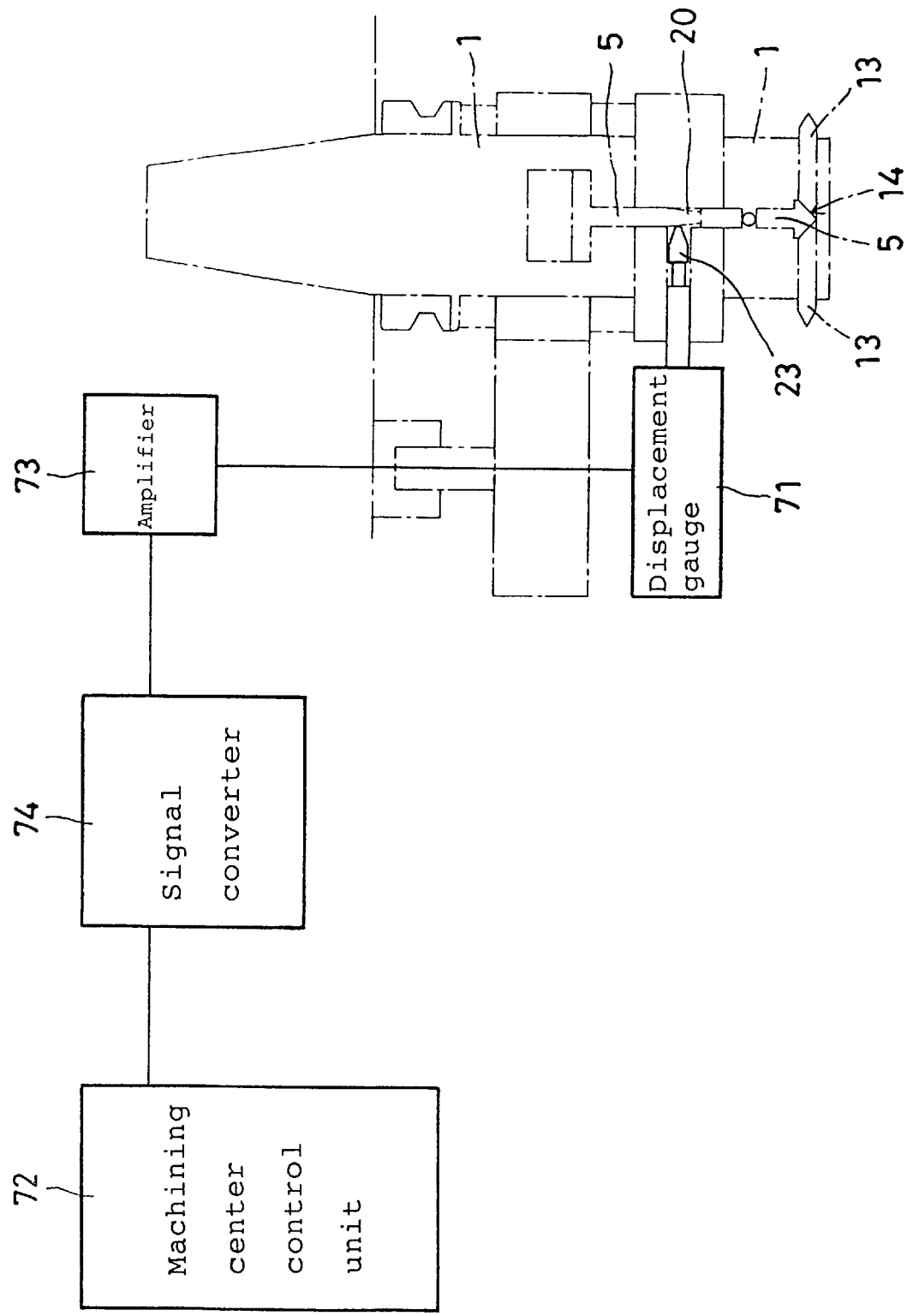
FIG. 7 is a circuit diagram of a fifth embodiment.

For retrieving an electrical signal, as shown in FIG. 7, for example, a minute displacement measured by the detector 20 is detected by the displacement gauge 71, and produced as an analog output proportional to the displacement by an amplifier 73. The analog signal of the amplifier 73 is converted by a signal converter 74 and output as a digital signal or an analog signal in the form that can be fetched by the control unit 72.

In the measuring method and the measuring apparatus according to this invention, the machined part of the work machined at a machining center can be immediately measured and the inspection in an inspection room or the like is not required.

As a result, the working efficiency of the machining center is remarkably improved and defective products can be easily discovered and immediately corrected. There is, therefore, no chance of occurrence of many defective products.

Also, the measuring work can be performed either manually or automatically, and the need of preparing many gauges is eliminated.

Further, the centripetal function permits the measuring work to be performed without regard to the wobbling of the base. Also, the slidable axial member and the means for pushing back the axial member to the intermediate position in the slide range thereof makes it possible to perform the measuring work by automatically correcting the measuring position even if the forward end of the probes fails to coincide with the ridge or the valley of the screw.

Also, since the measurement is applied to the control unit of the machining center, automation (unmanned system) is possible.

What is claimed:

1. A measuring apparatus comprising a base mounted removably on a spindle of a machining center, a slider incorporated along the axial center of said base in such a manner as to slide by the operation of an operating unit exposed on the outside of said base, a plurality of probes adapted to slide inward or outward at equidistant positions on the outer peripheral surface at the forward end of said base and protruded through an appropriate interlocking mechanism when said slider slides in one direction, an appropriate detector for detecting the size of the portion of each probe protruded with the slide of said slider and a display unit arranged on the outside of said base for displaying the measurement of said detector.

2. A measuring apparatus according to claim 1, characterized in that the displacement measured by a displacement gauge is retrieved as an electrical signal in the measuring of said detector and input to the control unit of the machining center.

3. A measuring apparatus according to claim 1, characterized in that the forward end of said base has a centripetal function.

4. A measuring apparatus comprising a base removably mounted on a spindle of a machining center, a fitting hole formed inward of the forward end of said base, an axial member slidably fitted in said fitting hole, stopper means for limiting the sliding range of said axial member, push-back means arranged on said axial member to push back said slide to the intermediate position of said sliding range, a piston built in the hollow chamber formed in said axial member for applying a backward restitutive power, a fluid supply path connected to the fluid path of the machining center and passing to the side of said hollow chamber behind the piston when said base is mounted on said machining center, a slider protruded forward together with said piston and slidably built at the axial center of said axial member, a thread probe adapted to slide inward or outward at the equidistant positions on the outer peripheral surface at the forward end of said base and protruded through an appropriate interlocking mechanism when said slider slides in one direction, a detector for detecting the size of the portion of each of said probes protruded with the slide of said slider and a display unit arranged on said axial member for displaying the measurement taken by the detector.

5. A measuring apparatus according to claim 4, characterized in that the forward end of said axial member has a centripetal function.

6. A measuring apparatus according to claim 4, characterized in that the displacement measured by a displacement gauge is retrieved as an electrical signal in the measuring of said detector and input to the control unit of the machining center.

7. A measuring apparatus comprising a base mounted removably on a spindle of a machining center, a piston built in a hollow chamber formed in said base for applying a backward restitutive power, a fluid supply path connected to the fluid path of the machining center and communicates with the side of said hollow chamber behind the piston when said base is mounted on said machining center, a slider protruded forward together with said piston and slidably built in the axial center of said base, a plurality of probes adapted to slide inward or outward at the equidistant positions on the outer peripheral surface at the forward end of said base and protruded through an appropriate interlocking mechanism when said slider slides in one direction, a detector for detecting the size of the portion of each of said probes protruded with the slide of said slider and a display unit arranged outside of said base for displaying the measurement taken by the detector.

8. A measuring apparatus according to claim 7, characterized in that the forward end of said base has a centripetal function.

9. A measuring apparatus according to claim 7, characterized in that the displacement measured by a displacement gauge is retrieved as an electrical signal in the measuring of said detector and input to the control unit of the machining center.

10. A measuring instrument comprising:

a base adapted to be mounted on a spindle of a machining center, said base having a central longitudinal passage;

a slider inserted in the central longitudinal passage of said base, said slider being capable of sliding in the central longitudinal passage;

an operating unit for operating said slider, said operating unit being disposed outside of said base;

a plurality of probes spaced equidistantly at a forward end of said base and adapted to slide inward or outward relative to an outer peripheral surface of the forward end of said base;

an interlocking mechanism connected to said slider and being capable of protruding said probes radially outwardly, with respect to the longitudinal axis of said base, when said slider slides in one direction; and a detector for detecting the extent of the protrusion of each of said probes when protruded in response to the sliding of said slider; and a display unit arranged outside of the base for displaying measurement data detected by said detector.

11. A measuring instrument as claimed in claim 10, further comprising a biasing mechanisms for biasing said probes toward a retracted position.

12. A measuring instrument as claimed in claim 10, wherein said operating unit is directly connected to said slider to permit manual operation of said slider.

13. A measuring instrument as claimed in claim 10, wherein said operating unit is operable to supply fluid, via a fluid supply path formed in said base, in order to advance said slider in the longitudinal passage of said base.

14. A measuring instrument as claimed in claim 10 further comprising a biasing device for biasing said slider away from said probes.

* * * * *